July 1, 1930.  L. E. GODDU  1,769,685

SNAP FASTENER SOCKET

Filed March 19, 1929

Inventor:
Louis E. Goddu
by Emery, Booth, Varney & Townsend
Attys

Patented July 1, 1930

1,769,685

UNITED STATES PATENT OFFICE

LOUIS E. GODDU, OF WINCHESTER, MASSACHUSETTS, ASSIGNOR TO UNITED-CARR FASTENER CORPORATION, OF CAMBRIDGE, MASSACHUSETTS, A CORPORATION OF MASSACHUSETTS

SNAP-FASTENER SOCKET

Application filed March 19, 1929. Serial No. 348,254.

My invention aims to provide improvements in snap fasteners and more particularly improvements in yieldable sockets.

In the drawings, which illustrate a preferred embodiment of the invention:

Figure 1:
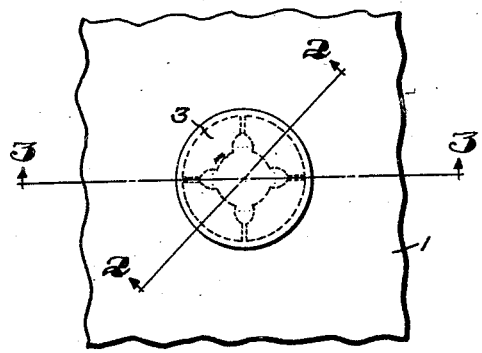
Figure 1 is a plan view of a socket installation.

Referring now to the embodiment of my invention illustrated in the drawings, I have shown a fastener socket installation of simple, durable and inexpensive construction. This installation comprises a flexible material 1, a socket part 2 and attaching means 3.

Figure 4:
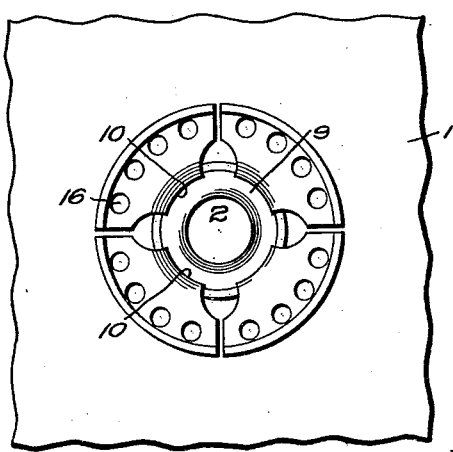
Fig. 4 is an elevation of the socket installation as viewed from the under side.

The socket part 2 is pressed from sheet metal and presents a cup-shaped portion having a base 4 and a side wall 5. A support engaging flange 6 extends laterally outwardly from the wall 5 and the metal adjacent to the mouth of the cup-shaped portion is rolled to provide a curved cross section to form a ledge 7, all as clearly shown in Figs. 2 and 3. The side-wall 5 and flange 6 are divided radially by a number of slits 8 which begin at the edge of the flange 6 and terminate adjacent to the base 4 of the cup-shaped portion. These slits 8 are very narrow (Fig. 4) from the edge of the flange 6 to a point about half way to the edge of the stud-receiving aperture 9 provided at the mouth of the cup-shaped portion. The slits are enlarged to a considerable extent for the remainder of their length. The purpose of the enlargement of the slits 8 is to reduce the amount of material between them thereby providing somewhat narrower stud-engaging jaws 10 than would be the case if the slits were narrow throughout their length.

Figures 2, 3:
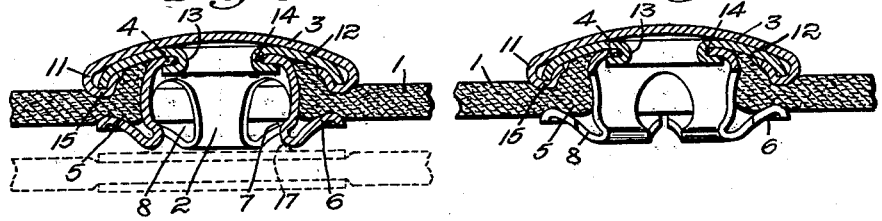
Fig. 2 is a section taken on the line 2—2 of Fig. 1, a stud installation being shown in dotted lines.
Fig. 3 is a section taken on the line 3—3 of Fig. 1.

The attaching means comprises a cap member 11 within which is enclosed a part 12 presenting a tubular rivet 13 in substantially the manner illustrated in Figs. 2 and 3.

When the parts of the socket installation are assembled, the cup-shaped portion of the socket is pressed into the flexible material 1 and the attaching part is pressed against the opposite side of the material 1 with the tubular rivet 13 passing through the hole 14 in the base 4 and upset, as shown in Figs. 2 and 3. The flexible material 1 is gripped relatively tightly between the flange 6 and the inturned edge 15 of the cap member 11.

The flange 6 may be provided with a series of spurs 16 which press into the material 1 and prevent lateral stress, exerted upon the flexible material, from pulling it out from between the flange 6 and edge 15.

The stud 17 is of a construction well known to those skilled in the separable fastener art and therefore I have merely illustrated it in dotted lines in Fig. 2.

When the stud and socket are engaged or disengaged, the head of the stud is forced through the stud-receiving aperture 9 and as it engages the jaws 10 the portions between the slits yield laterally to enlarge the aperture 9 and permit passage of the stud head.

I have found that the action of this socket is much smoother with the narrow jaws provided by the enlargement of the slits than the same type of socket with narrow slits providing wider jaws. Furthermore, the flexible portions are less apt to become set because the enlarged slits reduce the width of the flexible portions at their ends near the base 4 where the greatest amount of flexing takes place.

While the slits might be made relatively wide throughout their length, I prefer to have them narrow adjacent to the edge of the flange 6 so that I may provide the largest area possible in the flange 6 for engagement with the flexible material.

With the construction of slits illustrated and described, I have all the advantages of narrow slits in the flange 6 and the additional advantage, which I claim as my invention, of the greater flexibility of the yieldable portions and the improved smooth action which takes place when the socket is engaged with or disengaged from a stud.

While I have illustrated and described a preferred embodiment of the invention, I do not wish to be limited thereby because the scope of my invention is best defined in the following claims.

Claims:

1. A snap fastener socket member comprising cup-shaped portion having a bottom and a side wall, a flange extending outwardly from the free edge of the side wall at the mouth of the cup, said flange and side wall being severed by a number of slits to permit enlargement of the mouth of the cup-shaped portion for passage of the head of a fastener stud and said slits being substantially enlarged at the junction of the flange and the side wall of the cup-shaped portion to provide between them stud-engaging jaws spaced substantial distances apart around the mouth of the cup-shaped portion and said slits being relatively narrow beginning at the peripheral edge of the flange and extending a substantial distance therefrom.

2. A snap fastener socket member comprising a cup-shaped portion having a bottom and a side wall, a flange extending outwardly from the free edge of the side wall at the mouth of the cup, said flange and side wall being severed by a number of slits to permit enlargement of the mouth of the cup-shaped portion for passage of the head of a fastener stud, each of said slits being relatively narrow from the outer edge of the flange to a point in the flange spaced from the mouth of the cup-shaped portion and the remainder of the slit being substantially enlarged as and for the purposes illustrated and described.

3. A snap fastener socket member comprising a cup-shaped portion having a bottom and a side wall, a flange extending outwardly from the free edge of the side wall at the mouth of the cup, said flange and side wall being severed by a number of slits to permit enlargement of the mouth of the cup-shaped portion for passage of the head of a fastener stud, a ledge at the mouth of the cup for engagement with the neck of a stud, and each of said slits being relatively narrow from the edge of the flange to a point in the flange spaced from the ledge to preserve as much of the flange as possible for engagement with a support to which the socket is to be attached, each of said slits being relatively wide where they pass through the ledge thereby to reduce the length of contact between the ledge and a stud when being engaged and disengaged to provide for smooth engaging and disengaging action.

4. A snap fastener socket member comprising a cup-shaped portion having a bottom and a side wall, a flange extending outwardly from the free edge of the side wall at the mouth of the cup, said flange and side wall being severed by a number of slits to to permit enlargement of the mouth of the cup-shaped portion for passage of the head of a fastener stud, a ledge at the mouth of the cup for engagement with the neck of a stud, and each of said slits being relatively narrow from the edge of the flange to a point in the flange spaced from the ledge to preserve as much of the flange as possible for engagement with a support to which the socket is to be attached, and each of said slits being approximately the same width at the ledge as a portion of the ledge between two of the slits thereby to reduce the length of contact between the ledge and a stud when being engaged and disengaged to provide for smooth engaging and disengaging action.

In testimony whereof, I have signed my name to this specification.

LOUIS E. GODDU.